Oct. 15, 1968 D. L. JOSLOW 3,405,461
RECORDING-PLAYBACK SYSTEM AND CONTROL THEREFOR
Filed Nov. 26, 1965
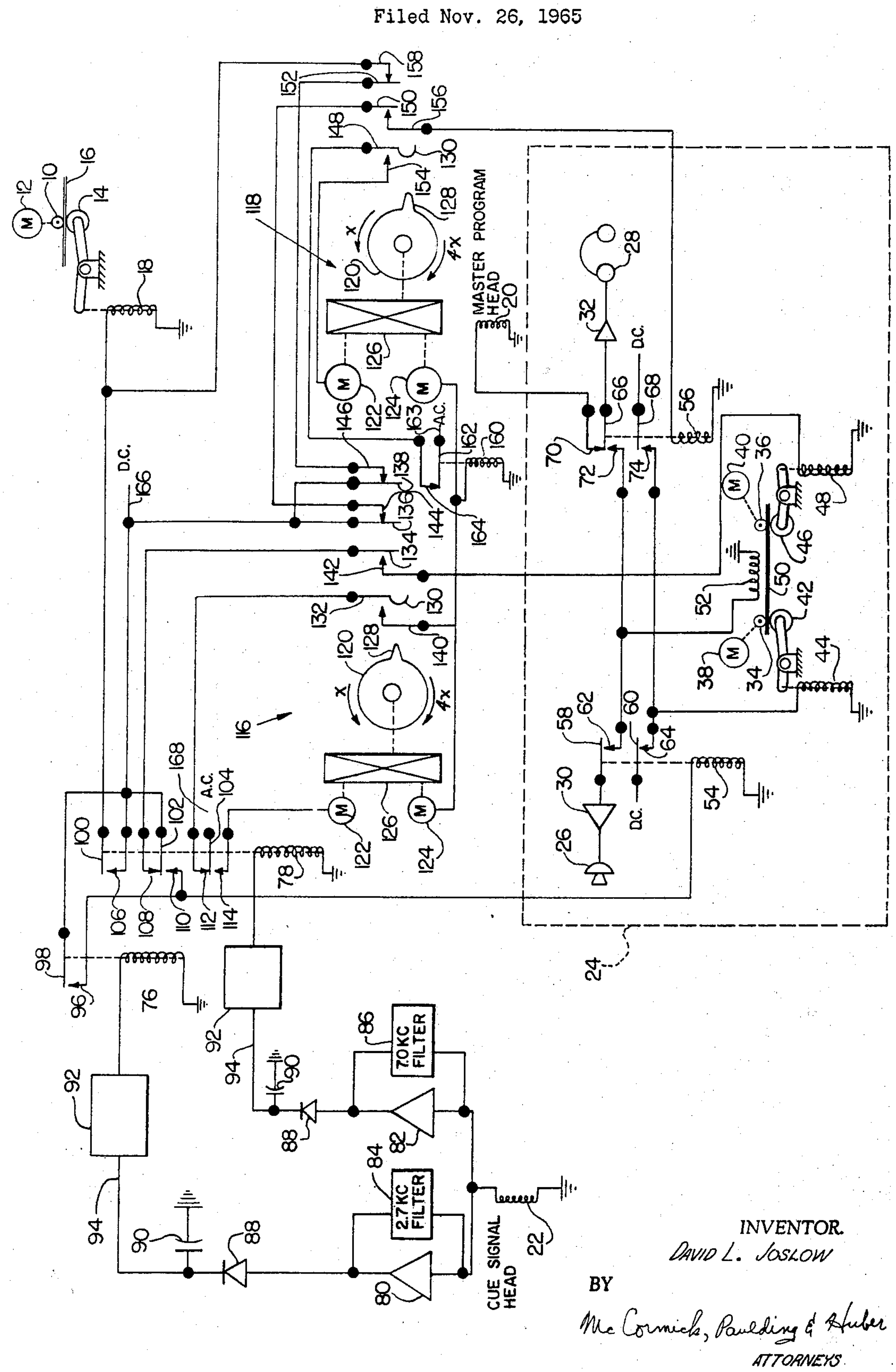
INVENTOR.
DAVID L. JOSLOW
BY
McCormick, Paulding & Huber
ATTORNEYS United States Patent Office 3,405,461

Patented Oct. 15, 1968

3,405,461

RECORDING-PLAYBACK SYSTEM AND CONTROL THEREFOR

David L. Joslow, Chester, Conn., assignor to Chester Electronic Laboratories, Inc., Chester, Conn., a corporation of Connecticut Filed Nov. 26, 1965, Ser. No. 509,947

13 Claims. (Cl. 35—35)

ABSTRACT OF THE DISCLOSURE

In an audio-teaching system or the like a student recorder is controlled by cue signals recorded, along with master program segments, on a master record played on a master recorder which may be used to simultaneously feed and control a number of student recorders and associated equipment. In one (testing) mode of operation the master program segments are separated by gaps filled with continuous cue signals, and the master recorder runs continuously. When a cue signal is reached the student recorder is turned on to record the student's response to the preceding program segment, and when this cue signal ends the student recorder is turned off and remains off during the playing of the following program segment. In another (record-review) mode of operation the master program segments are also separated by gaps filled with continuous cue signals. When a cue signal is reached, the student recorder is turned on to record the student's response to the preceding program segment, and when the cue signal ends the master recorder is stopped and the student recorder is then returned, through the action of a timer, to the beginning of the response period and the response is replayed before the master recorder is restarted to play the following program segment.

This invention relates to a recording-playback system and to a means for controlling the operation of the various components making up the system, and deals more particularly with a control means for use in a recording-playback system including one or more recording-playback machines and a single master playback machine adapted to supply program material to the recording-playback machines or to sound reproducing devices associated with the recording-playback machines.

The control apparatus of the present invention has utility with regard to various different recording-playback systems, and there is no intention to limit the broader aspects of the control concept to any particular use or system. Nevertheless, at present the greatest utility of the system is found in connection with audio-teaching laboratories of the type in which one or more students located at one or more work areas may listen to a recorded master program and make vocal responses which are recorded for review or other purposes on the tape or other recording medium of a recording-playback machine separate from the machine supplying the master program. Each student is assigned a separate recording-playback machine or at least a separate track of a multitrack machine so that his vocal responses may be recorded and played back separate from those of other students. Although different recording mediums may be used, magnetic tape is the preferred medium and hereinafter in the discussion which follows the recording medium will for convenience be considered to be tape.

In a laboratory as described above, it may be desired, for example, to test the students by means of a series of questions, or similar material requiring responses or answers, recorded on the master program tape. In this case, the student recording-playback machine or machines may be operated at the end of each question for a given time to individually record the response of each student on a separate tape or tape channel. After the test, the teacher can then evaluate each student's performance by replaying the various tapes or tape channels. This manner of operation of the laboratory equipment will hereinafter be referred to as the "testing mode" of operation. At other times, it may be desired to operate the laboratory in a "record-review" mode during which the master program tape, as played by the master program machine, again supplies each student with questions or the like requiring vocal responses, with the questions being followed by periods of silence sufficiently long to permit each student to make a proper response. The response of each student is recorded by the student recording-playback equipment on an individual tape or tape channel, and at the end of the response period the recording-playback machine is operated to play back the response so that the student may hear and evaluate his own performance on the last question before proceeding with the next question. This mode of operation is particularly advantageous in the teaching of foreign languages where each question may be in the form of a short phrase or sentence spoken in the foreign language with the student attempting to repeat the phrase in his own voice.

The general object of this invention is to provide a means for controlling the functioning of one or more recording-playback machines and an associated master program machine to provide for automatic operation of said machines in either of the above-described testing or record-review modes.

Another object of the present invention is to provide a control system such as mentioned in the preceding paragraph and whereby the machines may be switched between operation in either the testing or record-review mode without any adjustment being required to either the recording-playback machine or the master program machine.

Another object of this invention is to provide a means for controlling the functioning of a recording-playback machine in response to signals, hereinafter referred to as "cue signals," appearing on the tape or other recording medium of a separate machine supplying program materials and whereby the recording-playback machine may be made to perform a desired function or sequence of functions at desired times throughout the course of the master program.

A more specific object of the invention is to provide a control means for automatically causing one or more recording-playback machines to operate in the record mode at desired times and for predetermined durations throughout the playing of a master program on a separate master program playback machine.

Another specific object of this invention is to provide a control means for automatically causing one or more tape recording-playback machines to operate in the record mode for a predetermined length of time, and to thereafter rewind and replay the length of tape used during the recording operation, the initiation of said sequence of operations and the duration of the recording time being controlled so that the recording and replaying functions of said recording-playback machine occur at desired times with regard to a master program played on a separate playback machine.

Other objects and advantages of the invention will be apparent from the following description and from the drawing forming a part hereof.

The drawing shows a preferred embodiment of the invention and such embodiment will be described, but it will be understood that various changes may be made from the construction disclosed and that the drawing and description are not to be construed as defining or limiting the scope of the invention, the claims forming a part of this specification being relied upon for that purpose.

Of the drawing:

The single figure of the drawing is a schematic illustration of an audio-teaching laboratory comprising a recording-playback system and control means embodying the present invention.

Turning now to the drawing, the illustrated audio-teaching laboratory includes a master program playback machine which is adapted to play back a master program prerecorded on a master magnetic tape. The master tape also has prerecorded thereon a plurality of signals, referred to as cue signals, which are used as hereinafter described to control the functioning of other components of the system. These cue signals may be superimposed on the master program, that is recorded on the same tape channel as the master program, but preferably a number of separate channels are provided on the master tape with one channel containing the master program and the other channel or channels containing the cue signals. The cue signals are in the nature of continuous signals which appear for various durations of time at spaced points along the length of the master tape. In the illustrated system, two different cue signals are utilized, one such signal being a 2.7 kilocycle tone and the other being a 7.0 kilocycle tone. Also in the illustrated system, one channel is used for the cue signals and suitable filter devices are used to distinguish between two different signals. It will be appreciated, however, that the filter devices could be eliminated if desired by using two separate tape channels for the two different signals and in which case the two different signals could be of the same frequency.

The master program playback machine may take various different forms as to the details of its construction and in the illustrated system includes two pick-up heads for picking up the prerecorded information from the two master tape channels and also includes a tape transport mechanism for moving the master tape at a desired speed past the two pick-up heads. In the figure, the tape transport mechanism is shown to consist of a capstan 10 driven continuously by an associated motor 12 and a pressure wheel 14. The master program tape is indicated at 16 and is located between the capstan 10 and the pressure wheel 14. The pressure wheel is movable into and out of tape feeding relation with the capstan 10 by an associated solenoid 18. Energization of the solenoid 18 moves the pressure wheel into tape feeding relation with the capstan to cause forward feeding of the tape 16 at the desired playback rate whereas de-energization of the solenoid moves the pressure wheel out of tape feeding relation with the capstan to stop the movement. The reference numeral 20 indicates the pick-up head associated with the tape channel containing the prerecorded master program and the reference numeral 22 indicates the pick-up head associated with the tape channel containing the prerecorded cue signals.

Also included in the illustrated system is a conventional booth or table or other means providing a student work area indicated generally by the area enclosed by the broken line 24. At the work area a microphone 26 is provided for picking up the student's voice and a sound reproducer, such as a pair of earphones 28, is also provided for converting electrical signals transmitted thereto into audible sounds. Associated with the microphone 26 is an amplifier 30 and associated with the earphones 28 is another amplifier 32. Also associated with the student work area 24 is a student recording-playback machine which is operable to record and subsequently play back through the earphones 28 the sounds picked up by the microphone 26. In the illustrated case, the student recording-playback machine is shown located at the work area 24, however, this arrangement is not necessary and if desired the recording-playback machine may be located remotely from the work area as for example in the same equipment room or cabinet as the master program machine. Also in the illustrated sysem, only one student work area is shown, but it will be obvious that any number of additional similar work areas could be provided in accordance with the same scheme. Where a large number of such work areas are provided, one student recording-playback machine may be used to service a number of work areas by adapting the machine for recording and playing back a number of tape channels simultaneously, each work area being assigned a particular one of the tape channels.

In its construction, the student recording-playback machine may take various different forms and for the purpose of discussion the illustrated machine is shown to comprise a tape transport mechanism including two separate capstans 34 and 36 which are continuously driven by two associated motors 38 and 40 respectively. The capstan 34 is rotated in one direction at a given speed and the capstan 36 is rotated in the opposite direction at a faster speed such as, for example, four times the speed of the capstan 34. A pressure roller 42 is associated with the capstan 34 and is moved into and out of tape feeding relation with the latter capstan by an associated solenoid 44. Similarly, a pressure roller 46 is associated with the capstan 36 and is moved into and out of tape feeding relation with the latter capstan by an associated solenoid 48. Energization of the solenoid 44 brings the pressure wheel 42 into tape feeding relation with the capstan 34 and causes the associated tape 50 to be moved in a forward direction at a given lineal speed. Energization of the solenoid 48 brings the pressure wheel 46 into tape feeding relation with the capstan 36 and causes the tape 50 to be moved in the reverse direction at a speed substantially greater than the forward speed. A tape head 52 is included in the student recording-playback machine and is positioned adjacent the path of travel of the tape 50 so as to be operable to either record or retrieve information on or from the tape 50 as the latter is moved in its forward direction.

As shown, the student recording-playback machine is operable in either a recording mode, a playback mode, a rewind mode or in a standby or inactive mode. Operation in either the record or playback modes is controlled respectively by two relays 54 and 56. The relay 54 has associated therewith two movable contacts 58 and 60 associated respectively with two fixed contacts 62 and 64. The two contacts 58 and 62 are normally open as are the two other contacts 60 and 64. The relay 56 has associated therewith two movable contacts 66 and 68 and three fixed contacts 70, 72 and 74. The movable contact 66 cooperates with the two fixed contacts 70 and 72, the contact 70 being normally closed relative to the contact 66 and with the contact 72 being normally open relative to the contact 66. The movable contact 68 cooperates with and is normally open relative to the fixed contact 74.

Energization of the relay 54 causes the student recording-playback machine to be operated in the record mode by closing the contacts 58 and 62 and the contacts 60 and 64. Closing the contacts 60 and 64 energizes the solenoid 44 to cause the tape 50 to be moved in the forward direction whereas closing the contacts 58 and 62 connects the tape head 52 with the microphone 26 and amplifier 30 to cause the sounds picked up by the microphone to be recorded on the tape 50. Operation of the relay 56 causes the recording-playback machine to operate in the playback mode by closing the contacts 66 and 72 and the contacts 68 and 74. Closing the contacts 68 and 74 energizes the solenoid 44 to cause the tape to be moved in the forward direction while closing the contacts 66 and 72 connects the tape head 52 with the amplifier 32 and the earphones 28 so that the recorded information picked up by the head 52 is reproduced as audible sounds by the earphones. When the relay 56 is deenergized, the closing of the contact 66 on the fixed contact 70 connects the master program head 20 with the amplifier 32 and earphones 28 so that the information picked up by the head 20 from the master program tape is reproduced by the earphones.

Operation of the student recording-playback machine in the rewind mode is effected by energizing the solenoid 48 to cause the tape 50 to be fed in the reverse direction at the fast rewind speed. When each of the three solenoids 44, 48 and 56 is denergized, the recording-playback machine is in its standby or inactive mode and ready for operation in any of its other three modes.

Associated with the recording-playback machine and with the master program machine is a control mechanism for controlling the operation of both machines in response to the cue signals recorded on the master tape 16 and picked up by the pick-up head 22. This control mechanism is such that the machines are operable in accordance with a testing mode of operation in response to the appearance of one form of cue signal and are operable in a record-review mode in response to the appearance of another form of cue signal. As mentioned previously, the cue signals causing operation in the testing mode in the illustrated case are 2.7 kilocycle tones and the cue signals causing operation in the record-review mode are 7.0 kilocycle tones. Each cue or tone signal appears continuously along a given length of the master tape and is followed by a length of tape at which no such signal appears. For example, each cue signal may appear along a length of tape equivalent to two to ten seconds playing time and may be followed by a signal free length of tape also equivalent to two to ten seconds playing time.

Referring to the figure, the control mechanism includes two relays 76 and 78 associated with means for differentiating between the two different cue signals and for causing energization of the relay 76 in response to the appearance of a 2.7 kc. cue signal and for causing operation of the relay 78 in response to the appearance of a 7.0 kc. cue signal. The circuitry or means for so distinguishing between the cue signals and for causing selective operation of the relays 76 and 78 may take various different forms but in the illustrated case is shown to consist of two amplifiers 80 and 82 each having as an input the output of the pick-up head 22. Associated with the amplifier 80 is a positive feedback circuit including a notch filter 84 tuned to pass 2.7 kc. signals. Similarly, the amplifier 82 has a positive feedback circuit associated therewith including a notch filter 86 tuned to pass 7.0 kc. signals. The gain of each of the amplifiers 80 and 82 is such that without the feedback provided by the associated feedback circuit the output of the amplifier is small and insufficient to drive the associated circuitry hereinafter described. That is, the amplifier 80 and its associated feedback circuit produce a significant output signal only when the signal picked up by the head 22 has a frequency of approximately 2.7 kc. The amplifier 82 and its associated feedback circuit produce a significant output only when the signal picked up by the head 22 has a frequency of approximately 7.0 kc. Associated with each amplifier 80 and 82 is a half-wave rectifying and filtering circuit comprising a diode 88 and a capacitor 90, and the rectified and filtered output produced by this circuit is transmitted to a trigger device 92 for operating the associated relay 76 or 78. Each of the devices 92, 92 may, for example, comprise a conventional Schmidt trigger circuit and operates in response to the appearance of a signal on the associated input line 94 to energize the associated relay 76 or 78.

The relay 76 includes a pair of normally open contacts 96 and 98. The relay 78 includes three movable contacts 100, 102 and 104 and five fixed contacts 106, 108, 110, 112 and 114, the contacts being normally in the relative open and closed positions shown. The movable contact 104 is connected to a source of AC potential by a supply line 168 and the fixed contact 106 is connected to a source of DC potential by a supply line 166.

Also included in the control portion of the system are two timing devices indicated generally at 116 and 118. Each of these timing devices consists of a movable output member in the form of a control cam 120 which is driven in one direction or the other by two associated drive motors 122 and 124 connected with the cam through a differential gear mechanism 126. Each differential gear mechanism 126 is so designed with relation to the output speed of the two associated motors 122 and 124 that energization of the motor 122 causes the associated cam 120 to be moved at a given speed in a forward direction and energization of the motor 124 causes the cam to be rotated at a faster speed in the opposite or reverse direction. Further, the ratio of the forward to the reverse speeds of each cam 120 is substantially equal to the ratio of the forward to the reverse or rewind speed of the program tape 50. For example, if the tape 50 is moved during rewinding at four times its normal forward speed, the reverse speed of the control cam 120 is similarly moved approximately four times its speed in the forward direction. For convenience, in the figure the forward speed of each control cam is indicated to be $x$ and the reverse speed to be $4x$, however any other speed ratio may be used to suit the particular speed ratio of the recording-playback machine. The speed of each cam 120 in the forward direction is also such that the cam completes less than one full revolution in the time consumed by the playing of the longest cue signal.

Each cam 120 includes a finger 128 which cooperates with the key 130 of an associated set of contacts. In the figure cams 120, 120 are shown in their initial starting condition at which time the fingers 128, 128 engage the keys 130, 130 and hold the associated movable contacts in the positions illustrated. Associated with the cam of the timer 116 are four movable contacts 132, 134, 136 and 138 and four fixed contacts 140, 142, 144 and 146. Associated with the cam of the timer 118 are three movable contacts 148, 150 and 152, and three fixed contacts 154, 156 and 158. The two motors 124, 124 are both connected to the fixed contact 140 and also connected to the same contact is the coil of an AC relay 160 having two normally closed contacts 162 and 164.

Having now described the construction of the control means, its operation may be described as follows. Consider first operation of the system in the testing mode. This mode of operation is achieved by a number of 2.7 kc. cue signals which appear for given durations of time at spaced points along the length of the master program tape 16. As long as no cue signal appears on the tape 16, the parts of the system are as shown in the figure. Assume now that a 2.7 kilocycle signal does appear. This signal through the action of the amplifier 80, the filter 84 and the trigger circuit 92 causes energization of the solenoid 76 to close the contacts 96 and 98. The closing of these latter two contacts completes a circuit from the DC supply line 166 to the relay 54 and therefore causes operation of the student record-playback machine in the record mode as above described. As long as the 2.7 kc. cue signal remains on the portion of the master tape passing the pick-up head 22, the relay 76 and the relay 54 will remain energized. Also, the relay 18 is maintained in an energized state to continue feeding of the master tape by the circuit extending from the DC supply line 166 through the closed contacts 136 and 144 and the closed contacts 152 and 158. At the termination of the cue signal, the relay 76 is deenergized opening the contacts 96 and 98 and deenergizing the relay 54 to return the student record-playback machine to its standby condition. In accordance with this manner of operation, the master program prerecorded on the master tape 16 may therefore consist of a plurality of program segments each consisting, for example, of a question and each spaced from the succeeding segment by a time duration or length of tape containing no program material. The channel containing the cue signals is so ar-ranged that the cue signals appear during the gaps separating the segments of the master program and are absent during the program segments. Therefore, the cue signals operate to cause the student record-playback machine to operate in the record mode for a given time following each program segment or question, thereby allowing the student's answer or response to the question to be recorded on the tape 50.

Considering next operation of the system in the review-record mode, this mode of operation is effected by a series of 7.0 kc. cue signals occurring for different lengths of time at spaced points along the length of the master program tape. Again, when no signals are present on the master program tape, the parts of the control apparatus are in the positions illustrated in the figure. When a 7.0 kilocycle cue signal does appear on the master program tape, it is picked up by the cue signal head 22 and through the amplifier 82, the filter 86 and the trigger circuit 92 operate the relay 78 to shift the state of the various pairs of contacts associated with the latter relay. Closing of the contacts 102 and 110 completes a circuit from the DC supply line 166 to the relay 54 to turn the student record-playback machine on in the record mode as above described. At the same time, closing of the contacts 104 and 114 energizes the slow forward motor 122 of the timer 116 from the AC supply line 168. The associated cam 120 is therefore driven at its slow speed in the forward (counterclockwise) direction. As soon as the cam 120 moves from its starting position, the contacts 138 and 144 of the associated switch are opened to break the circuit previously energizing the solenoid 18, but for the present the latter solenoid is maintained in an energized condition to continue feeding of the master tape 16 by an alternate circuit through the now closed contacts 100 and 106 of the relay 78.

As long as the 7.0 kilocycle cue signal remains on the portion of the tape 16 passing the pick-up head 22, the student record-playback machine continues to operate in its record mode, the cam 120 of the timer 116 continues to move in the forward direction away from its starting position and the master program machine continues to feed the master tape 16.

When the 7.0 kilocycle signal terminates, the relay 78 is deenergized to return its contacts to the original positions shown in the figure. At this time the cam 120 of the timer 116 is off-normal, or removed from its starting position, and the contacts of the associated switch are in their corresponding off-normal state. The deenergization of the relay 78 opens the contacts 100 and 106 and breaks the circuit to the solenoid 18 to stop the movement of the master tape 16, the contacts 136 and 144 now being in an open condition due to the off-normal condition of the associated timer cam 116. The deenergization of the solenoid 78 in addition to stopping the feeding of the master tape 16 also switches the student recording-playback machine from the record mode to the rewind mode of operation and starts both of the timers 116 and 118 running in their fast reverse directions. The change in the function of the student recording-playback machine is effected by the opening of the contacts 102 and 110 which deenergizes the solenoid 54 and by the closing of the contacts 102 and 108 which apply DC voltage from the supply line 166 through the now closed contacts 134 and 142 to the solenoid 48. Operation of the two timers in their fast reverse directions is effected first by the opening of the contacts 104 and 114 which deenergizes the slow forward motor 122 of the timer 116 and secondly by the closing of the contacts 104 and 112 which energizes both of the fast reverse motors 124, 124 through the now closed contacts 130 and 140. The AC solenoid 160 is connected to the same contact 140 as the two motors 124, 124 and is therefore operated simultaneously with the latter motors to open its normally closed contacts 162 and 164. Operation of the motor 124 of the first timer at this time causes the associated cam 120 to be returned clockwise toward its initial or normal position whereas the operation of the motor 124 of the other timer causes its associated cam 120 to be moved clockwise away from its initial or normal position.

The operation of the student recording-playback machine in its rewind mode and the movement of the two cams 120, 120 in their fast reverse directions is maintained until the cam finger 128 of the timer 116 is returned to its initial starting position. When the latter event occurs, the associated key 130 is operated to return the associated contacts to their illustrated normal positions and to initiate the next following step of the operational sequence. At this point it should be observed, however, that due to the forward and reverse speeds of the cams being related to each other in approximately the same ratio as the forward and reverse speeds of the tape 50, the tape 50 will have been rewound by a length equal to the length transported in the forward direction during the preceding period of operation in the record mode. Similarly, the cam 120 of the second timer 118 will be displaced from its starting position by a distance related to the amount of tape rewound.

The operation of the key 130 by the return of the finger 128 of the timer 116 to its initial starting position switches the function of the student recording-playback machine from the rewind to the playback mode, stops the reverse movement of both of the cams 120, 120 and starts the cam 120 of the timer 118 moving in its slow forward (counterclockwise) direction so as to return the same toward its initial starting position.

The switching of the function of the student recording-playback machine is effected by the opening of the contacts 134 and 142 which deenergizes the solenoid 48 and by the closing of the contacts 136 and 144 which completes a circuit from the DC supply line 166 through the now closed contacts 150 and 156 to energize the solenoid 56. The stopping of the two fast reverse drive motors 124, 124 is accomplished by the opening of the contacts 132 and 140 which in addition to deenergizing the latter motors also deenergizes the AC relay 160 to close its associated contacts 162 and 164. Closing of the latter set of contacts completes a circuit from the associated AC supply line 163 through the now closed contacts 148 and 154 to energize the slow forward motor 122 of the second timer 118.

The operation of the student recording-playback machine continues in its playback mode and the forward movement of the cam of the timer 118 continues until the finger 128 of the latter cam is returned to its initial starting position. It will again be observed that due to the similar forward to reverse speed ratios of the cams and of the tape 50, the tape 50 will have been moved forwardly by a length approximately equal to the length rewound during the preceding rewind operation by the time the cam of the timer 118 regains its normal or starting position.

When the cam 120 of the second timer does regain its initial starting position, the student recording-playback machine is switched from its playback mode to its inactive or standby mode of operation and the master program machine is returned to its active tape feeding condition. Also, all four drive motors of the two timers 116 and 118 are deactivated so that the two cams 120, 120 remain at their initial starting positions. The switching of the function of the student recording-playback machine is accomplished by the opening of the contacts 150 and 156 which deenergizes the solenoid 56. Closing of the contacts 152 and 158 completes a circuit to the solenoid 18 to move the associated pressure wheel 14 into tape feeding relation with the master tape 16 and capstan 10. Opening of the contacts 148 and 154 deenergizes the previously active motor 122 of the timer 118. The master tape 16 will now continue to be fed in the forward direction until another 7.0 kc. cue signal is picked up by the head 22 at which time the sequence of operations above described will be again performed.

From the above description of the operation of the system in its record-review mode, it will be understood that the master program recorded on one channel of the master tape 16 may consist of a plurality of program segments occupying given lengths of the master tape and which latter lengths of tape are separated from each other by other lengths of tape on which no program material is present. Similarly, the channel containing the cue signals may be arranged so that no cue signal is present at the same time as a program segment but is present continuously throughout each of the gaps separating the program segments. If the master tape is prerecorded in this manner, the system will then operate to first play back a segment of the master program to the student, thereafter operate in the record mode to record the student's response, and to then rewind and replay to the student the portion of the tape containing his last response. Following this the next program segment is played and followed by another sequence of recording, rewinding and replaying operations.

The invention claimed is:

1. The combination comprising means providing a student work area including a microphone and a sound reproducer, a program machine for playing back a record medium having recorded thereon a master program and a plurality of cue signals, means connected with said program machine for picking up said master program from said record medium and for transmitting the same to said sound reproducer at said work area, a recording machine separate from said program machine for recording sounds picked up by said microphone, and control means connected with said program machine for picking up said cue signals from said record medium and responsive to said picked up cue signals for controlling the operation of said separate recording machine, said record medium being a master magnetic tape and said recording machine being a recording-playback machine for recording sounds picked up by said microphone and for subsequently playing back said sounds to said sound reproducer, said cue signals being in the nature of continuous signals appearing for given durations at spaced locations along the length of said master tape, and said control means being responsive to a picked-up cue signal of a given character for causing said recording-playback machine to operate in the record mode and responsive to the termination of said latter cue signal for terminating operation of said recording-playback machine in the record mode.

2. The combination defined in claim 1 further characterized by said recording-playback machine being a magnetic tape machine using a magnetic tape separate from said master magnetic tape, means operable after said termination of the operation of said recording-playback machine in the record mode for causing said recording-playback machine to rewind said separate tape for a length substantially equal to the length used during the preceding period of operation of the record mode, and means for thereafter causing said recording-playback machine to play back said latter length of tape to said sound reproducer.

3. The combination defined in claim 2 further characterized by means responsive to the completion of the playing back of said latter length of tape for terminating operation of said recording-playback machine in the playback mode and for placing the same in a stand-by condition.

4. The combination defined in claim 2 further characterized by means responsive to the termination of said cue signal for stopping the operation of said master program machine, and means responsive to the completion of the playing back of said latter length of tape for again starting the operation of said program machine.

5. The combination defined in claim 2 further charcterized by means responsive to a picked up cue signal of a different given character for causing said recording-playback machine to operate in the record mode throughout the duration of said latter cue signal and responsive to the termination of said latter cue signal for terminating operation of said recording-playback machine in the record mode and for placing the same in a stand-by condition.

6. The combination comprising means providing a student work area including a microphone and a sound reproducer, a program machine for playing back a master record having recorded thereon a master program in the form of a plurality of program segments and also having recorded thereon cue signals located between the end of each of said program segments and the beginning of the next succeeding one of said program segments, means connected with said program machine for picking up said master program from said master record and for transmitting the same to said sound reproducer at said work area, a recording-playback machine separate from said program machine for recording on a separate recording medium sounds picked up by said microphone and for subsequently playing back said sounds from said recording medium to said sound reproducer, and control means responsive to said cue signals for causing said recording-playback machine at the end of each of said program segments to first operate in the record mode for a predetermined length of time and to thereafter operate in the playback mode and play back through said second reproducer the material recorded on said recording medium during said predetermined length of time, said control means also including means operable during the aforesaid operation of said recording-playback machine and responsive to said cue signals for stopping said program machine at the beginning of the next succeeding one of said program segments and means for thereafter restarting said program machine after said recording-playback machine has completed its playing back of the material recorded on said record medium during said predetermined length of time.

7. The combination define in claim 6 further characterized by said record medium of said recording-playback machine being a magnetic tape separate from said master record, and said control means including means for first causing said recording-playback machine to operate in the record mode for a predetermined length of time and for thereafter rewinding and playing back through said sound reproducer a length of tape substantially equal to that used during the record mode of operation.

8. The combination comprising tape transport mechanism having means selectively operable in forward or reverse modes to cause the same to respectively feed tape in a forward direction at a given speed or to feed tape in the reverse direction at a faster speed, two timing devices each of which includes a movable output member and each of which timing devices is selectively operable in forward or reverse modes to cause its output member to respectively be moved in a forward direction at a given speed or in the reverse direction at a faster speed, the ratio of the forward speed to the reverse speed of each of the output members of said timing devices being substantially equal to the ratio of the forward speed to the reverse speed of said tape transport mechanism, means responsive to a start signal for initiating operation of said tape transport mechanism and of the first of said timing devices in their forward modes, said operation of said first timing device causing its output member to be moved away from its starting position, means responsive to a subsequent stop signal for terminating said latter operation of said tape transport mechanism and of said first timing device in their forward modes and for initiating operation of said tape transport mechanism and both of said timing devices in their reverse modes, said latter operation of said timing devices causing the output member of said first device to be returned toward its starting position and causing the output member of the second device to be moved away from its starting position, means responsive to the return of the output member of said first device to its starting position for terminating said latter operation of said tape transport mechanism and of said timing devices in their reverse modes and for initiating operation of said tape transport mechanism and of said second timing device in their forward modes, said latter operation of said second timing device causing its output member to be returned toward its starting position, and means responsive to the return of the output member of said second device to its starting position for terminating said latter operation of said transport mechanism and of said second timing device in their forward modes.

9. The combination defined in claim 8 further characterized by each of said timing devices comprising two selectively operable drive motors and a differential gear mechanism drivingly connected between said drive motors and the associated output member.

10. The combination as defined in claim 8 further characterized by a microphone and a sound reproducer associated with said tape transport mechanism, means selectively operable in either a record mode to cause sounds picked up from said microphone to be recorded on the tape fed by said tape transport mechanism or a playback mode to cause previously recorded sounds to be picked up from said tape and reproduced by said sound reproducer, means for conditioning said latter means to operate in the record mode when said tape transport mechanism is first operated in the forward mode, said first operation being initiated by said start signal, and means for conditioning said latter selectively operable means to operate in the playback mode the second time said tape transport mechanism is operated in its forward mode.

11. The combination as defined in claim 10 further characterized by a tape playback machine having a tape transport mechanism separate from said first mentioned tape transport mechanism for playing back through said sound reproducer a master program recorded on a master program tape, said start and stop signals being recorded on said master program tape so that the sequence of functions controlled by said signals occur at desired points in said master program.

12. The combination as defined in claim 11 further characterized by said master program being recorded on one channel of said master tape and said start and stop signals being recorded on another channel of said master tape.

13. The combination as defined in claim 11 further characterized by means for stopping the operation of said tape transport mechanism of said master program playback machine during the time said first mentioned tape transport mechanism is operated in its reverse mode and during its immediately following period of operation in the forward mode.

References Cited

UNITED STATES PATENTS

| | | | |
|---|---|---|---|
| 3,269,033 | 8/1966 | Redfield et al. ------ | 35—35.3 |
| 3,323,230 | 6/1967 | Cooper ------------ | 35—35.3 |

EUGENE R. CAPOZIO, *Primary Examiner.*

W. H. GRIEB, *Assistant Examiner.*